Oct. 9, 1934.   G. O. W. HEIJKENSKJÖLD   1,976,168
BATHING PLANT
Filed March 25, 1932   2 Sheets-Sheet 1
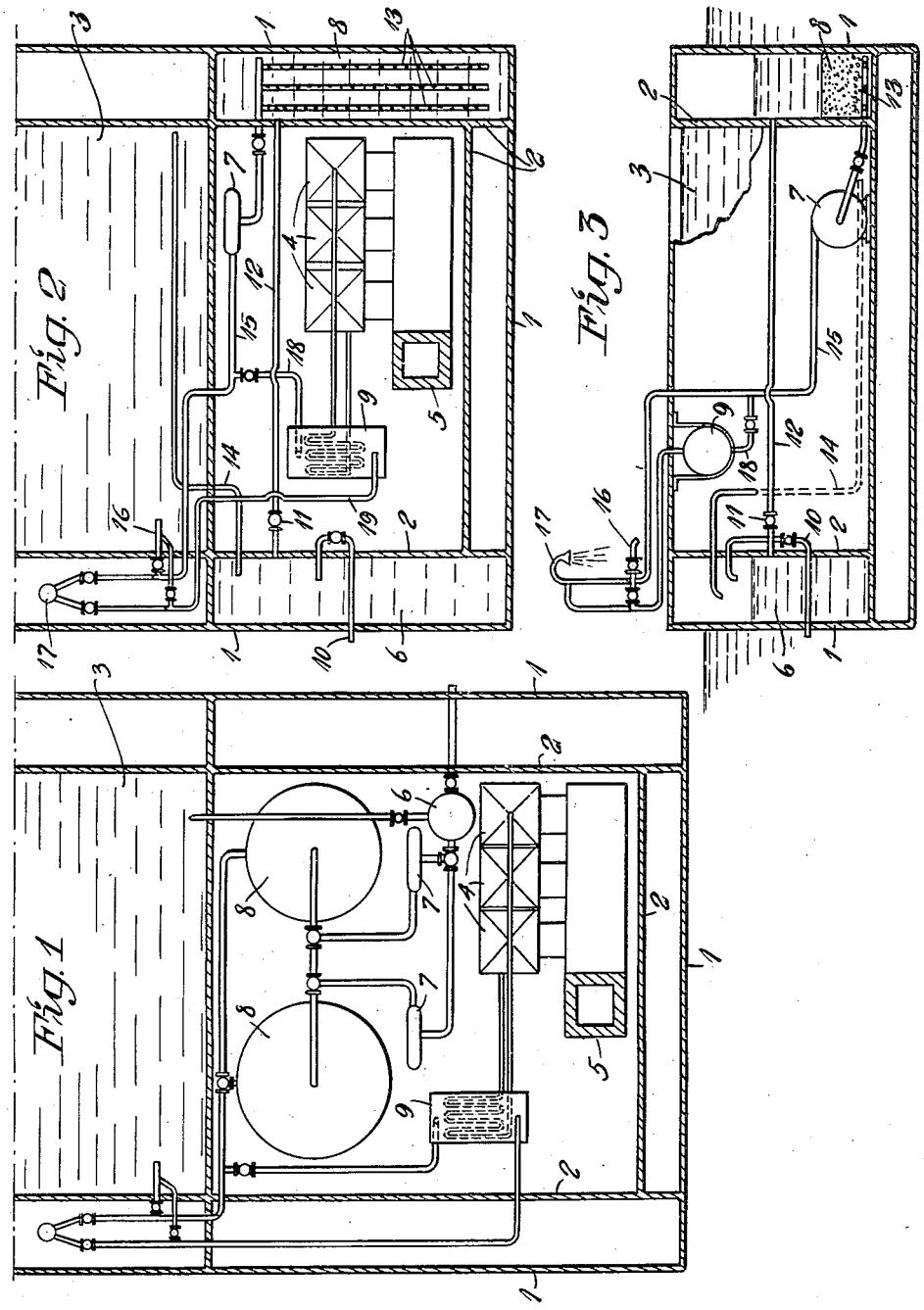

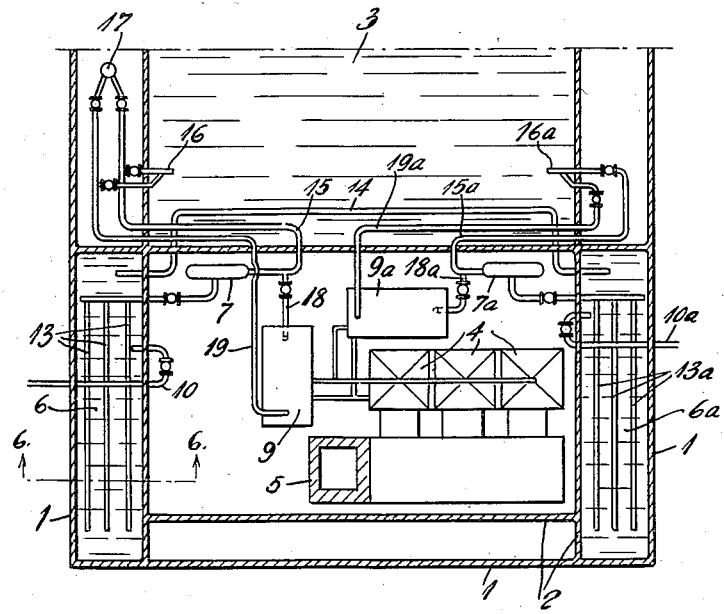
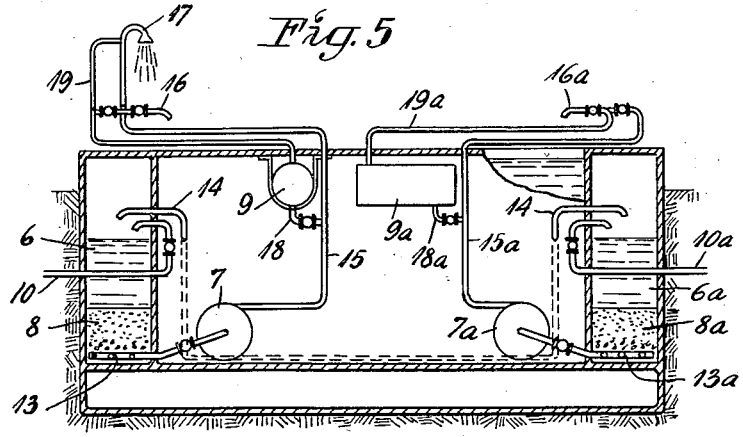
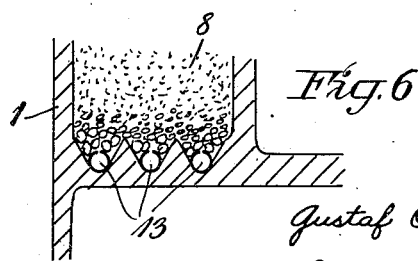

Patented Oct. 9, 1934

1,976,168

UNITED STATES PATENT OFFICE 1,976,168

BATHING PLANT

Gustaf Olof Wolfgang Heijkenskjöld,
Stockholm, Sweden

Application March 25, 1932, Serial No. 601,226
In Sweden March 30, 1931

16 Claims. (Cl. 210—11)

The present invention relates to bathing plants provided with swimming pools and has for its object to construct and to arrange bathing plants and particularly floating bathing plants in an economic and advantageous manner.

In a floating bathing plant provided with a swimming pool it is known to construct the pontoon proper with double outer walls in order to obtain the necessary buoyancy and to insulate the plant and especially the water of the swimming pool from the surrounding water. In such bathing plants it has been proposed to arrange the engine room at one end of the floating structure while placing the swimming pool in the other end. The machine equipment incorporates a purifying plant for the bathing water and generally comprises one or more filters, mostly sand filters, and in some cases also a precipitating tank and a sterilizing apparatus, for instance for treating the water with chlorine in some suitable form.

Bathing plants of the kind described are generally adapted to be placed in the harbour of larger cities and will therefore float in strongly contaminated water. For economical reasons the bathing water is, if possible, taken from the surrounding water and in such cases it is necessary to subject the water to a very thorough purification before using it in the bathing plant. This brings the disadvantage that the purifying plant, which should also be used to keep the water of the swimming pool in a pure state, becomes very large and occupies too much of the space available within the floating structure. Hitherto, the purifying plant was placed in the engine room since other spaces are occupied for other purposes and since it would cause a great amount of superfluous pump work if the purifying plant were placed on the deck of the floating pontoon. The filters belonging to the purifying plant are almost without exception round and, since they often have a diameter of several meters the floating structure becomes very large insofar as the engine room occupies an unproportionally large part of the same.

The main object of my invention is to arrange the purifying plant and especially the filters and precipitating tanks in such a manner that a bathing plant for a given size of the swimming pool can be made considerably smaller than hitherto. In the drawings, Fig. 1 shows a section through a part of a bathing plant having a purifying plant of the kind heretofore used. Fig. 2 shows a section through a bathing plant according to the invention, the plant being designed for the same size of the swimming pool as the plant shown in Fig. 1. Fig. 3 shows a cross section through the plant shown in Fig. 2. Figs. 4 and 5 show similar sections through a bathing plant of a modified form. Fig. 6 shows a detail.

In Fig. 1, 1 and 2 denote the walls of the floating swimming bath having a swimming pool 3. 4 are boilers for heating the plant and the water used therein. 5 is the smoke stack, 6 is a precipitating tank, 7 pumps for forcing the water through the filters 8, and 9 a hot water producer. From a comparison with Fig. 2, in which as well as in the other figures the same reference characters denote the same structural details as in Fig. 1, it is obvious that the filters 8 make the engine room very large and indeed very much larger than in the plant shown in Fig. 2 although this plant is of the same capacity and has a swimming pool of the same size. As shown in Figs. 2 and 3, I have been able to reduce the size of the bathing plant by placing the precipitating tank 6 and the filter 8 between the walls 1 and 2 forming the outer walls of the engine room. The space between the walls at the left hand side of the figures serves as a precipitating tank while the space at the right hand side serves as a filter or as shown a precipitating tank as well as a filter. If necessary, I could also use the space between the walls at the short end of the bathing plant for filtering purposes. I may even, in extraordinary cases, place filters or precipitating tanks in the spaces between the outer walls of the swimming pool but in such cases it would be necessary to insulate the walls of the swimming pool from the interspaces, in order to avoid a loss of heat. Although I prefer to construct the whole structure of reinforced concrete the interspaces between the outer walls of the swimming pool should be filled with a medium less heat-conducting than water. I therefore prefer to arrange the filters between the double outer walls of the engine room since in such case it is not necessary to provide a heat insulating coating, air-filled spaces or some other kind of insulation.

In Figs. 2 and 3, the water to be used in the plant flows in by gravity through the pipe 10 opening into the precipitating tank 6 preferably above the water surface in the same. I may also arrange a perforated plate or the like below the inner mouth of the pipe 10 so that the water will be evenly distributed over the surface of the tank and a strong water jet avoided. One or more precipitating agents, such as aluminium sulphate, are added to the tank 6 and thus the contaminations are precipitated and sink to the bottom of the tank. At intervals the valve 11 is opened so that water from the tank 6 may flow through the pipe 12 to the filter 8. Of course, if the incoming water is evenly distributed as well in the tank 6 as in the filter so that the water in these receptacles is kept practically still-standing the valve 11 may be continuously kept open. In the filter 8 I provide a layer of sand on the surface of which such contaminations will deposit as are not precipitated by the action of the precipitating agents. The water thus purified is sucked out by the pump 7 from the well formed at the bottom of the filter space 8. This well is shown on a larger scale in Fig. 6 and consists of a series of grooves in which are placed perforated pipes 13 connected to the suction side of the pump 7. In order to prevent the pipes 13 or the perforations thereof from being filled with sand I prefer to arrange a layer of gravel or broken stone and more preferably coarse grained chippings, shingle or rubble stone over the pipes 13.

Since the water taken in through pipe 10 may be very cold it may be necessary to raise the temperature thereof, in order to facilitate the precipitation of contaminations therein. For this purpose, hot water may be added to the tank 6, or a steam coil similar as in the hot water producer 9 and fed with steam from the boilers 4 may be placed therein. Since the desirable temperature for effecting the precipitation is only 8 to 10 degrees centigrade, I prefer, however, to take the necessary amount of water for this purpose from the swimming pool which has a temperature of not less than 20° C. The water flows by gravity from the bottom of the swimming pool through the pipe 14. The connection through this pipe may be opened only at intervals and when required but I prefer to keep the pipe open so that the water of the swimming pool is continuously circulated through the filter and returned to the pool.

By means of the pipes 15 and 16 the pump 7 delivers the water to the swimming pool and to the shower bath 17. One part of the water coming from the pump 7 goes through the pipe 18 to the hot water producer 9, and after being heated it leaves the same through pipe 19. This pipe 19 delivers the water as well to the pipe 16 opening into the swimming pool as to the shower bath 17. If found desirable, I may also arrange a water preheater of the recuperative type in which the cold water leaving the pump 15 or entering through pipe 10 may be heated by means of the discharge water from the shower baths or tub baths arranged in the bathing plant. To raise the temperature of the water in the precipitating tank 6, I may allow the discharge water from the shower bath to enter the tank 6. This discharge water generally has a temperature of 33° C., and as a rule it is not so much contaminated that the purification thereof will be uneconomical.

In the embodiment shown in Figs. 4 and 5, the space between the outer walls is used as a precipitating tank 6 and 6a respectively and as a filter 8 and 8a respectively. Water from an outer source is admitted through the pipes 10 and 10a, and simultaneously or at intervals water flows from the swimming pool through the pipe 14 into the tanks. In these combined precipitating tanks and filters, the water stands practically still to a certain height over the sand layers thus leaving time for the precipitates to sink to the bottom and to deposit on the sand layer. The purified water from the filter 8 is sucked out through the pipes 13 by means of the pump 7 and leaves the pump through the pipe 15 which delivers the water to the shower bath 17 and the swimming pool 16. In the same way as described in connection with Figs. 2 and 3, one part of the filtered water may be led through the hot water producer 9 and delivered to the swimming pool and to the tub baths and shower baths 17.

By means of the pipes 13a the pump 7a sucks out the water purified in the filter 8a and delivers the water through the pipes 15a and 16a to the swimming pool and simultaneously through the pipe 18a, hot water producer 9a and the pipe 19a likewise to the swimming pool.

My invention is not limited to the embodiments above described. While still gaining space and lessening the size of the bathing plant I may place one part of the purifying plant in the engine room instead of between the outer walls of the plant. In most cases a sterilizing apparatus could be placed in the engine room or on the deck of the pontoon. The precipitating tank is not absolutely necessary since I can obtain a sufficient purification of the water with filters alone, but in such case I must employ larger filters and I must also see to it that the water has a sufficiently high temperature and that precipitating agents are added to the same before it enters the sand layer of the filter. In each case I arrange manholes or the like in the walls of the precipitating tanks or filters adjacent the engine room so as to make the interspaces accessible for cleaning purposes and the like. Also in a floating bathing plant the heat insulation will be quite sufficient in the embodiments described above, as the purifying plant is only arranged in the spaces between the walls of the engine room and since the bottom of the floating structure is insulated in its entire extension by means of the air-filled interspaces.

What I claim is:—

1. A floating bathing plant having a purifying plant for the bathing water and consisting of a floating structure having double outer walls, the purifying plant being at least in part placed in interspaces between the outer walls.

2. A bathing plant as claimed in claim 1, in which the purifying plant comprises a precipitating tank cooperating with a filter.

3. A bathing plant as claimed in claim 1, comprising a swimming pool and an engine room containing the necessary machine equipment, the purifying plant being arranged wholly within the interspaces between the outer walls surrounding the engine rooms.

4. A bathing plant as claimed in claim 1, in which the purifying plant comprises a precipitating tank arranged in the space between the walls at one side of the engine room and a filter placed between the walls on the opposite side of the engine room.

5. A bathing plant as claimed in claim 1, in which the lower part of the interspaces between the outer walls surrounding the engine room contains a sand layer serving as a filter and the upper part of the interspaces serves as a precipitating tank, the water to be filtered being located above the sand layer and flowing by gravity through said layer.

6. A floating bathing plant having double outer walls, a purifying plant for the bathing water located at least in part in interspaces between said outer walls, means for supplying crude water to said purifying plant, and means for supplying water at a temperature higher than that of the crude water to said purifying plant, whereby the crude water can be heated to a temperature facilitating the precipitation in the purifying plant.

7. A floating bathing plant having a floating structure with double outer walls, a precipitating tank located within the interspaces between said outer walls, means for supplying crude water to said precipitating tank and means for supplying heated water to be mixed with said crude water in said precipitating tank, whereby the water in the tank is raised to a temperature to facilitate precipitation.

8. A floating bathing plant comprising a floating structure having double outer walls, a purifying plant for the bathing water comprising a precipitating tank and a filter located within the interspaces between the said outer walls, connecting conduits between the precipitating tank and the filter on the one hand and the filter and the swimming pool on the other hand, and valve means interposed in said conduits, whereby the precipitating tank and the filter may be filled by gravity.

9. In a floating bathing plant having double outer walls, the interspaces between said walls being subdivided into sections and a filter being arranged in one of said sections.

10. In a floating bathing plant having double outer walls, the interspaces between said walls being subdivided into sections and a precipitating tank being arranged in one of said sections.

11. In a floating bathing plant, a floating structure having double walls, a swimming pool and an engine room within said walls and a purifying plant located within the interspace between that portion of said double walls adjacent the engine room, whereby the said pool is insulated and engine room space is economized.

12. In a floating bathing plant, a floating structure having double walls, an engine room and a swimming pool located within said walls, and a purifying plant located below the level of the swimming pool and within the interspace between that portion of the double walls adjacent the engine room.

13. A floating bathing plant having a floating structure with double walls, a swimming pool and engine room located within said double walls, a precipitating tank located within the interspace between that portion of said walls adjacent the engine room, means for supplying crude water to said precipitating tank, and means conveying water from said swimming pool to said precipitating tank.

14. A floating bathing plant comprising a floating structure having double walls, a swimming pool and an engine room located within said double walls, a purifying plant for the bathing water comprising a precipitating tank and a filter located within the interspace between that part of said walls adjacent the engine room, connecting conduits between the precipitating tank and the filter on the one hand and the swimming pool on the other hand, and valve means interposed in said conduits.

15. In a bathing plant having double outer walls, a swimming pool, an engine room, means separating the interspace between said walls around the swimming pool from the interspace of said walls around the engine room, a purifying plant located in the interspace between said walls adjacent the engine room.

16. In a bathing plant having double walls, a swimming pool and an engine room located within said double walls, means separating the interspace between said double walls around the swimming pool from the interspace between said double walls around the engine room, filtering means located in the interspace between said walls adjacent said engine room and a precipitating tank located above said filtering means.

GUSTAF OLOF WOLFGANG
HEIJKENSKJÖLD.